United States Patent
Pan et al.

(10) Patent No.: US 9,092,844 B2
(45) Date of Patent: Jul. 28, 2015

(54) METHOD AND APPARATUS FOR CORRECTING CORNER POINT OF IMAGE AND IMAGE PROCESSING DEVICE

(71) Applicant: Fujitsu Limited, Kawasaki (JP)

(72) Inventors: Pan Pan, Beijing (CN); Yuan He, Beijing (CN); Jun Sun, Beijing (CN); Satoshi Naoi, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 129 days.

(21) Appl. No.: 13/740,571

(22) Filed: Jan. 14, 2013

(65) Prior Publication Data

US 2013/0182969 A1    Jul. 18, 2013

(30) Foreign Application Priority Data

Jan. 17, 2012    (CN) .......................... 2012 1 0015198

(51) Int. Cl.
*G06K 9/50*    (2006.01)
*G06T 5/00*    (2006.01)
*G06T 7/00*    (2006.01)

(52) U.S. Cl.
CPC ............... *G06T 5/001* (2013.01); *G06T 7/0083* (2013.01); *G06T 2207/10008* (2013.01); *G06T 2207/20164* (2013.01); *G06T 2207/30176* (2013.01)

(58) Field of Classification Search
USPC ................................................. 382/199–201
See application file for complete search history.

(56) References Cited

U.S. PATENT DOCUMENTS

| | | | |
|---|---|---|---|
| 2005/0207652 A1* | 9/2005 | Albertelli et al. | 382/199 |
| 2006/0002603 A1 | 1/2006 | Beauchaine et al. | |
| 2006/0165276 A1* | 7/2006 | Hong et al. | 382/153 |
| 2007/0206877 A1 | 9/2007 | Wu et al. | |
| 2009/0245583 A1* | 10/2009 | Fukumoto et al. | 382/104 |
| 2010/0053410 A1* | 3/2010 | Yoshii et al. | 348/333.11 |
| 2010/0086050 A1* | 4/2010 | Badawy | 375/240.16 |
| 2010/0309347 A1 | 12/2010 | Adams, Jr. et al. | |

(Continued)

FOREIGN PATENT DOCUMENTS

| | | |
|---|---|---|
| CN | 101460937 | 6/2009 |
| KR | 10-2004-0016878 | 2/2004 |

(Continued)

OTHER PUBLICATIONS

European Office Action dated Jul. 4, 2014 in corresponding European Patent Application No. 13151636.1.

(Continued)

*Primary Examiner* — Jingge Wu
(74) *Attorney, Agent, or Firm* — Staas & Halsey LLP

(57) ABSTRACT

The present invention discloses a method and apparatus for correcting a corner point of an image and an image processing device. The method includes: determining first candidate corner points of an initial corner point in a first local region; obtaining information related to the image in a second local region; selecting, among the first candidate corner points of the initial corner point, the first candidate corner points meeting a predetermined condition, as second candidate corner points of the initial corner point according to the information; and correcting the initial corner point using the second candidate corner points of the initial corner point. The apparatus is configured to perform the processes of the method. The image processing device includes the apparatus for correcting a corner point of an image. With the technology, a roughly detected corner point can be corrected.

14 Claims, 8 Drawing Sheets

(56) References Cited

U.S. PATENT DOCUMENTS

| | | | |
|---|---|---|---|
| 2011/0242616 A1* | 10/2011 | Oto | 358/448 |
| 2012/0014610 A1* | 1/2012 | Nakashi et al. | 382/195 |
| 2012/0070101 A1* | 3/2012 | Kogan et al. | 382/281 |
| 2013/0051671 A1* | 2/2013 | Barton | 382/173 |

FOREIGN PATENT DOCUMENTS

| | | |
|---|---|---|
| KR | 10-2006-0046135 | 5/2006 |
| KR | 10-2010-0114848 | 10/2010 |

OTHER PUBLICATIONS

Extended European Search Report issued Apr. 15, 2013 in corresponding European Application No. 13151636.1.

J. Alison Noble, "Finding Corners", Image and Vision Computing, vol. 6 No. 2, May 1988, pp. 121-128.

Devi Parikh et al., "Localization and Segmentation of a 2D High Capacity Color Barcode", Applications of Computer Vision, 2008, pp. 1-6.

Devi Parikh et al., "Localization and Segmentation of a 2D High Capacity Color Barcode", Applications of Computer Vision, WACV 2008, IEEE Workshop, Jan. 9, 2008, pp. 1-7.

Korean Office Action mailed Jan. 16, 2014 in corresponding Korean Application No. 10-2013-0005591.

Chinese Office Action mailed Feb. 27, 2015 in corresponding Chinese Application No. 201210015198.1.

\* cited by examiner

METHOD AND APPARATUS FOR CORRECTING CORNER POINT OF IMAGE AND IMAGE PROCESSING DEVICE

CROSS-REFERENCE TO RELATED APPLICATION

This application claims priority to Chinese Patent Application No. 201210015198.1, filed on Jan. 17, 2012, and all the benefits accruing therefrom under 35 U.S.C. §119, the contents of which in its entirety are herein incorporated by reference.

FIELD OF THE INVENTION

The present invention generally relates to the field of image processing and in particular to a method and apparatus for correcting a corner point of an image and an image processing device.

BACKGROUND OF THE INVENTION

For image scanning systems/apparatuses, a scanned image is generally distorted, e.g., subjected to perceptive transformation, stretching-deformation, etc., in both a traditional flat-panel scanner and an advanced set-top curved-surface scanner. It is thus important to remove these distortions and correct the scanned image. In order to attain this object, it is crucial to obtain true corner points of the scanned image because these corner points are parameters of a document correction model.

When true corner points of a document are obtained in some of existing methods and/or detectors for detecting a corner point (e.g., a Harris technology to detect a corner point), such methods may suffer from low precision due to insufficient information available thereto.

SUMMARY OF THE INVENTION

In view of the foregoing drawback in the prior art, an object of the invention is to provide a method and apparatus for correcting a corner point of an image and an image processing device so as to overcome the problem of low detection precision in an existing method/detector for detecting a corner point.

In order to attain the foregoing object, there is provided according to an aspect of the invention a method for correcting a corner point of an image, including: with regard to each initial corner point of the image, determining first candidate corner points of the initial corner point in a first local region that contains the initial corner point, wherein the first local region has a first predetermined size; with regard to each initial corner point of the image, obtaining information related to the image in a second local region that contains the initial corner point, wherein the second local region has a second predetermined size and contains the first local region; selecting, among the first candidate corner points of each initial corner point, first candidate corner points which meet a predetermined condition, as second candidate corner points of the initial corner point according to the obtained information related to the image; and correcting each initial corner point using the second candidate corner points of the initial corner point.

According to another aspect of the invention, there is further provided an apparatus for correcting a corner point of an image, including: a first selecting unit, configured to determine, with regard to each initial corner point of the image, first candidate corner points of the initial corner point in a first local region that contains the initial corner point, wherein the first local region has a first predetermined size; a calculating unit, configured to obtain, with regard to each initial corner point of the image, information related to the image in a second local region that contains the initial corner point, wherein the second local region has a second predetermined size and contains the first local region; a second selecting unit, configured to select, among the first candidate corner points of each initial corner point, first candidate corner points which meet a predetermined condition as second candidate corner points of the initial corner point according to the obtained information related to the image; and a correction processing unit, configured to correct each initial corner point using the second candidate corner points of the initial corner point.

According to another aspect of the invention, there is further provided an image processing device including the apparatus for correcting a corner point of an image.

According to a further aspect of the invention, there is further provided a corresponding computer readable storage medium on which computer program executable by a computing device is stored, wherein the program upon being executed can cause the computing device to embody the method for correcting a corner point of an image or the apparatus for correcting a corner point of an image.

The method for correcting a corner point of an image, the apparatus for correcting a corner point of an image and the image processing device according to the above embodiments can achieve at least one of the following benefits: a roughly detected corner point of the image can be corrected; and a precise corner point can be obtained by correcting the roughly detected corner point to thereby improve the precision of processing the image.

These and other advantages of the invention will become more apparent from the following detailed description of preferred embodiments of the invention with reference to the drawings.

DETAILED DESCRIPTION OF THE INVENTION

Figure 1:
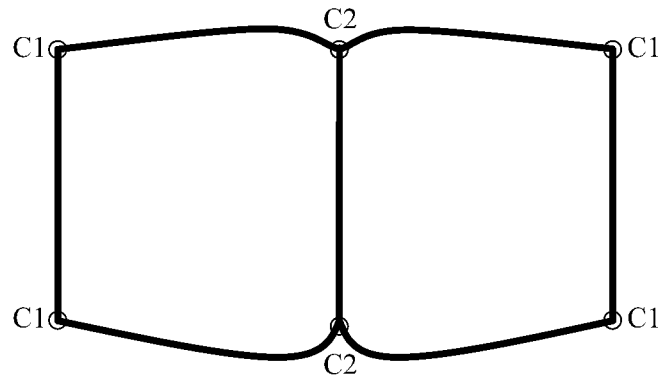
FIG. 1 is a schematic diagram illustrating a curved-surface scanned image of an opened book.

Exemplary embodiments of the present invention will be described below in conjunction with the accompanying drawings. For the sake of clarity and conciseness, not all the features of practical implementations have been described in the specification. However it shall be appreciated that during developing of any of such practical implementations, numerous implementation-specific decisions shall be made to achieve developer's specific goals, for example, to comply with those system- and business-related constraining conditions which will vary from one implementation to another. Moreover it shall also be appreciated that such a development effort might be complex and time-consuming but may simply be a routine task for those skilled in the art benefiting from this disclosure.

It shall further be noted that only those device structures and/or process steps closely relevant to the solutions of the invention will be illustrated in the drawings while other details less relevant to the invention are omitted so as not to obscure the invention due to those unnecessary details.

A method for correcting a corner point of an image according to an embodiment of the invention includes: with regard to each initial corner point of the image, first candidate corner points of the initial corner point is determined in a first local region that contains the initial corner point, wherein the first local region has a first predetermined size; with regard to each initial corner point of the image, information related to the image is obtained in a second local region that contains the initial corner point, wherein the second local region has a second predetermined size and contains the first local region; first candidate corner points which meet a predetermined condition are selected among the first candidate corner points of each initial corner point as second candidate corner points of the initial corner point according to the obtained information related to the image; and each initial corner point is corrected using the second candidate corner points of the initial corner point.

Particularly the image as mentioned here may be a scanned image of a document, a photographic image of a document, etc. Furthermore those skilled in the art shall generally appreciate the document as mentioned here in a broad sense, that is, the document as mentioned here includes various forms of documents, e.g., a business card, a single sheet of paper with a text, an image or other content thereon, a plurality of sheets of paper bound together (unopened), an opened book, etc.

Furthermore the initial corner point of the image as mentioned here may be given by a user or obtained in some methods for roughly detecting a corner point in the prior art.

For example, when the image as mentioned here is a scanned image of a document in one example, it is sometimes necessary for a user to click manually a corner point of the scanned image for confirmation. However the point clicked on by the user may possibly not be a true corner point, for example, due to a low-resolution display. Thus the point clicked on by the user in this case can be taken as the initial corner point of the image as mentioned here and further can be corrected in the method for correcting a corner point of an image according to the embodiment of the invention.

It shall be further noted that the initial corner point of the image can relate to two types of corner points, which are a right-angled corner point and a non-right-angled corner point. The following description will be given taking a scanned image of a document as an example.

For example, when the image is a scanned image of a business card, a single sheet of paper or a plurality of sheets of paper bound together (unopened), "the initial corner point of the image" relates to only one type of corner point, i.e., a right-angled corner point.

In another example, when the image is a scanned image of a set-top curved-surface of an opened book, "the initial corner point of the image" relates to two types of initial corner points. For example, FIG. 1 is a schematic diagram illustrating a curved-surface scanned image of an opened book, where C1 represents a right-angled corner point, and C2 represents a non-right-angled corner point.

As can be apparent with reference to FIG. 1, the right-angled corner point as mentioned here is a corner point at which typically two sides perpendicular to each other intersect prior to scanning, for example, the right-angled corner points C1 are corner points corresponding respectively to four locations of top-left, bottom-left, top-right and bottom-right of the opened book in FIG. 1; and the non-right-angled corner point as mentioned here is a corner point at which typically two sides which are not perpendicular to each other intersect prior to scanning, for example, the non-right-angled corner points C2 are corner points corresponding respectively to two locations of middle-top and middle-bottom of the opened book (corresponding to both ends of the spine of the book) in FIG. 1.

A specific example of the method for correcting a corner point of an image according the embodiment of the invention will be described below with reference to FIG. 2.

Figure 2:
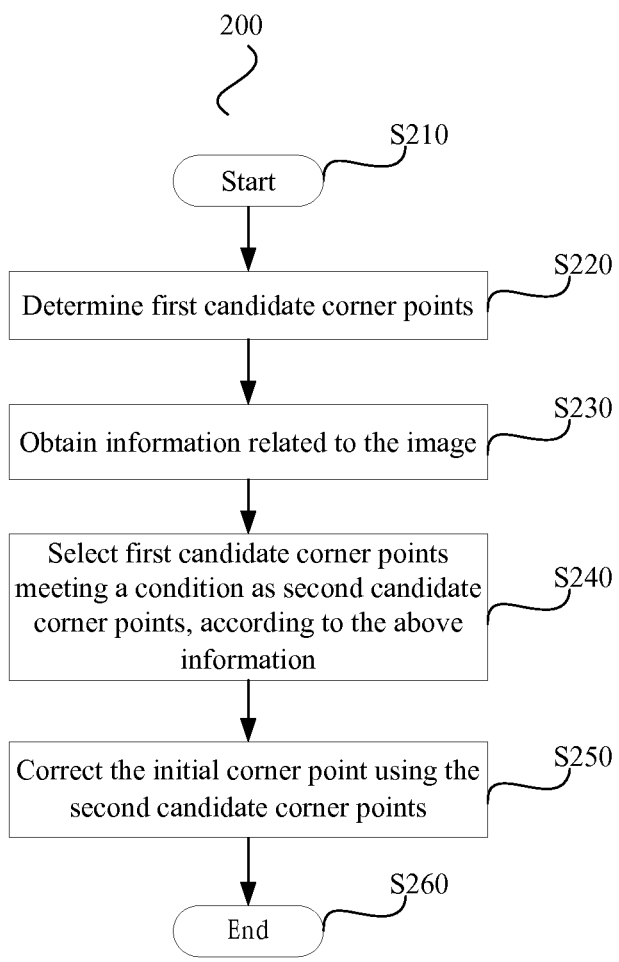
FIG. 2 is a flow chart illustrating schematically an exemplary process of a method for correcting a corner point of an image according to an embodiment of the invention.

FIG. 2 is a flow chart illustrating schematically an exemplary process of a method for correcting a corner point of an image according to an embodiment of the invention. As illustrated in FIG. 2, the process flow 200 of the method for correcting a corner point of an image starts with the step S210 and then proceeds to the step S220.

In the step S220, with regard to each initial corner point of the image, first candidate corner points of the initial corner point is determined in a first local region that contains the initial corner point, where the first local region has a first predetermined size. Then the flow proceeds to the step S230.

Figure 3:
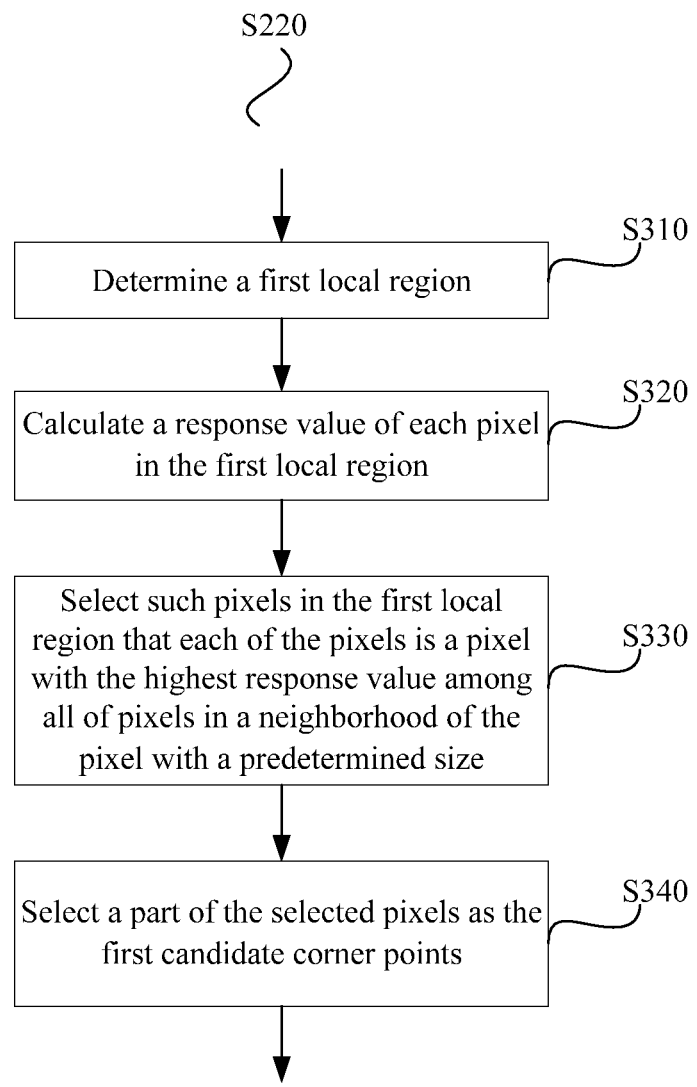
FIG. 3 is a flow chart illustrating schematically a specific exemplary process of the step S220 in the process flow 200 as illustrated in FIG. 2.

Particularly in a specific implementation of the method for correcting a corner point of an image according the embodiment of the invention, the operation performed in the step S220 on each initial corner point of the image can be performed in the steps S310 to S340 to be described below with reference to FIG. 3. FIG. 3 is a flow chart illustrating schematically a specific exemplary process of the step S220 in the process flow 200 as illustrated in FIG. 2.

Specifically for each initial corner point of the image, first candidate corner points of each initial corner point can be determined in the steps S310 to S340. For the sake of convenience, a process flow of the steps S310 to S340 will be described below in details taking a specific initial corner point of the image (referred below to as an initial corner point to be corrected) as an example. Those skilled in the art shall appreciate a process flow for each of other initial corner points of the image will be identical to the process flow here, and a repeated description thereof will be omitted here.

As illustrated in FIG. 3, firstly a first local region is determined in the step S310 so that the first local region contains the initial corner point to be corrected and has a first predetermined size. Then the flow proceeds to the step S320.

Figure 4:
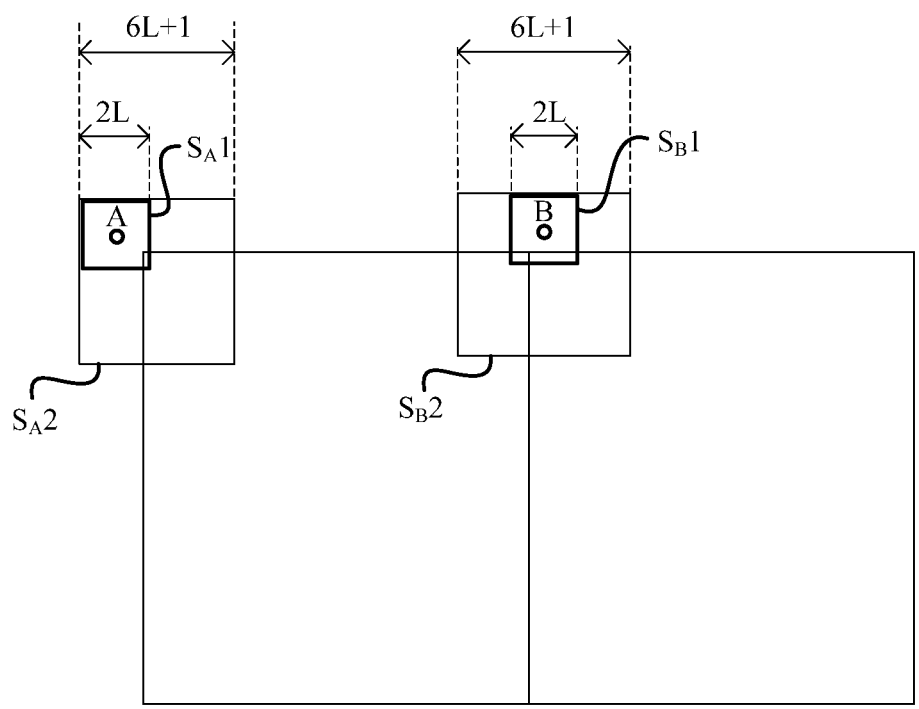
FIG. 4 is a schematic diagram illustrating a first local region and a second local region of an initial corner point to be corrected as well as a location relationship between them.

Particularly the determined first local region may be a square region, a rectangular region, a round region, etc. For example, FIG. 4 illustrates schematically a scanned image of an opened book and further a first local region containing the initial corner point to be corrected (e.g., initial corner points A and B to be corrected) (e.g., a first local region $S_A1$ containing the initial corner point A to be corrected and a first local region $S_B1$ containing the initial corner point B to be corrected). As illustrated in FIG. 4, the first local region $S_A1$ containing the initial corner point A to be corrected and the first local region $S_B1$ containing the initial corner point B to be corrected may be square regions, centered at the initial corner points A and B to be corrected, with a side length of 2L, respectively. The value of L here may be a predetermined real number and can be derived experimentally or empirically. Furthermore other parts illustrated in FIG. 4 will be described below.

Then in the step S320 a response value of each pixel in the first local region is calculated, where the response value can be calculated, for example, in a method for calculating a Harris or Alison Noble corner point response value. Then the flow proceeds to the step S330.

In a preferred implementation, for example, an Alison Noble corner point response value of each pixel in the first local region can be calculated in a method, for example, as described in "Finding Corners" by J. Alison Noble in The British Machine Vision Conference, 1987. Here the Alison Noble corner point response value can be defined as:

$$Mc=((Ix^2)*(Iy^2)-(Ix*Iy)^2)/((Ix^2)+(Iy^2)+eps).$$

In the above equation, Ix and Iy represent respectively a gradient in the horizontal direction (simply referred to as a horizontal gradient) and a gradient in the vertical direction (simply referred to as a vertical gradient) after Gaussian smoothing. Furthermore eps represents a constant preset so as to avoid the denominator from being zero. It shall be noted that the horizontal gradient and the vertical gradient here can alternatively be gradients enhanced dependent upon the content of the document.

Then in the step S330, such pixels can be selected in the first local region, for example, in a non-local-maximum-limit method, that each of the pixels is a pixel with the highest response value among all of pixels in a neighborhood of the pixel with a predetermined size. For the sake of convenience, the selected pixels will be referred below to as preliminarily selected pixels. Then in the step S340, a part of the preliminarily selected pixels are selected as the first candidate corner points.

For example, in the above example where the first local region is a square region with a side length of 2L, "a neighborhood with a predetermined size" of a specific pixel in the first local region may be a round region with a radius of, for example, 0.1L, or a neighborhood in another shape with another size (not shown), centered at the pixel, Thus for each pixel in the first local region, it is determined respectively whether the pixel is that pixel with the highest response value among all of pixels in a round region, centered at the pixel, with a diameter of, for example, 0.2L. If so, then the pixel is selected and retained; otherwise, the pixel is discarded. It shall be noted that when a neighborhood with a predetermined size of a specific pixel in the first local region (especially a pixel close to an edge of the first local region) exceeds the scope of the first local region, only those pixels in the scope of the first local region will be considered.

In an example, those pixels with response values above a first predetermined threshold among the preliminarily selected pixels can be selected as the first candidate corner points. For example, preferably, when the initial corner point to be corrected is a non-right-angled corner point, such pixels can be selected as the first candidate corner points of the corner point.

In another example, first N1 pixels with the highest response values among the preliminarily selected pixels can be selected as the first candidate corner points, where N1 is a predetermined natural number, e.g., 100. For example, preferably, when the initial corner point to be corrected is a right-angled corner point, such pixels can be selected as the first candidate corner points of the corner point.

Thus the first candidate corner points of each initial corner point can be determined respectively by performing the process flow of the steps S310 to S340 as illustrated in FIG. 3 for each initial corner point of the image.

Turning to FIG. 2, in the step S230, with regard to each initial corner point of the image, information related to the image is obtained in a second local region that contains the initial corner point, where the second local region has a second predetermined size and contains the first local region. Then the flow proceeds to the step S240.

Particularly the second local region containing the initial corner point may be a square region, a rectangular region, a round region, etc. Furthermore for each initial corner point of the image, the first local region containing the initial corner point is made a subset of the second local region containing the initial corner point no matter how the first local region and the second local region are shaped and sized.

Furthermore "the information related to the image" as mentioned here refers to an image feature which can embody a layout characteristic of the document image, for example, information on pixels in a specific region. "The information related to the image" here may be one type of information related to the image or a plurality of types of information related to the image, and this will be described exemplarily.

In the step S240, first candidate corner points which meet a predetermined condition are selected among the first candidate corner points of each initial corner point as second candidate corner points of the initial corner point according to the information related to the image determined in the step 230. Thus the first candidate corner points are filtered in the steps S230 and S240. Then the flow proceeds to the step S250. Particularly the predetermined condition may be set according to "the information related to the image", and this will be described exemplarily. Furthermore for a specific initial corner point, the number of "first candidate corner points which meet a predetermined condition" (that is, second candidate corner points) may be one or more.

Then in the step S250, each initial corner point is corrected using the second candidate corner points of the initial corner point. Then the flow proceeds to the step S260. Particularly when the number of second candidate corner points of a specific initial corner point is one, in the step S250, this one second candidate corner point of the initial corner point can be substituted for the initial corner point to thereby correct the initial corner point. Furthermore when the number of second candidate corner points of a specific initial corner point is more than one, one of the more than one second candidate corner point can be selected and substituted for the initial corner point itself according to "the information related to the image" to thereby correct the initial corner point.

The process flow 200 ends at the step S260.

Operation examples of performing the steps S230 to S250 will be given below with reference to FIG. 4 to FIG. 9.

Figure 5:
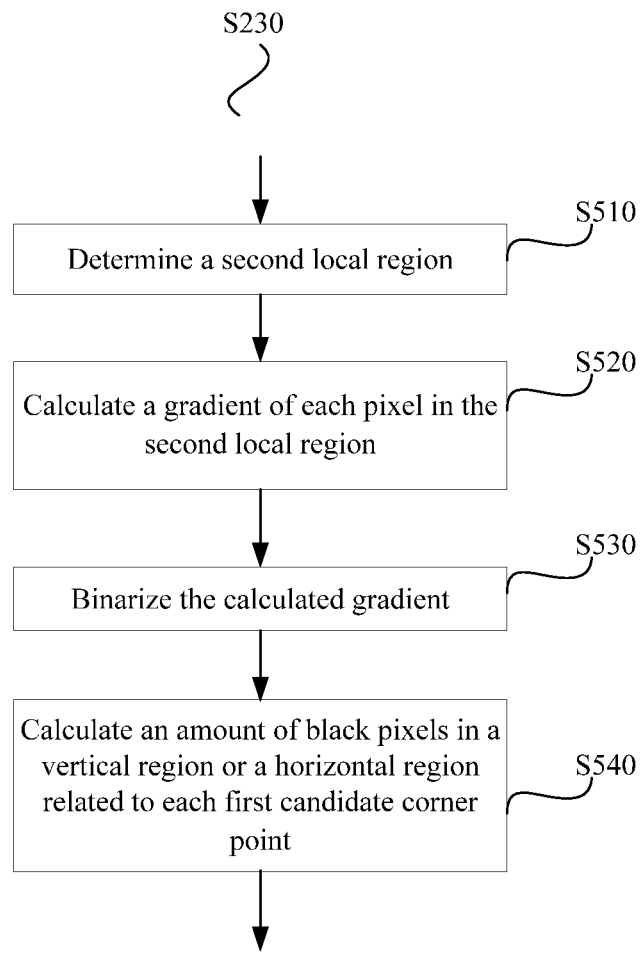
FIG. 5 is a flow chart illustrating schematically a possible exemplary process of the step S230 in the process flow 200 as illustrated in FIG. 2.

In a specific implementation of the method for correcting a corner point of an image according to an embodiment of the invention, the process of the step S230 as described above with reference to FIG. 2 can be performed in the steps S510 to S540 as illustrated in FIG. 5. The following description will be given still taking as an example a process performed for the initial corner point to be corrected, and a process for each of other initial corner points of the image can be performed with reference to the process performed for the initial corner point to be corrected.

As illustrated in FIG. 5, in the step S510, a second local region containing the initial corner point to be corrected is determined, where the second local region has a second predetermined size and contains the first local region. Then the flow proceeds to the step S520. For example, FIG. 4 illustrates schematically the first local region and the second local region containing the initial corner point to be corrected as well as a location relationship between them.

As illustrated in FIG. 4, in the case that the first local region containing the initial corner point to be corrected is a square region with a side length of 2L (e.g., a first local region $S_A1$ containing an initial corner point A to be corrected and a first local region $S_B1$ containing an initial corner point B to be corrected), the second local region containing the initial corner point to be corrected may be, for example, a square region with a side length of (6L+1) (e.g., a second local region $S_A2$ containing the initial corner point A to be corrected and a second local region $S_B2$ containing the initial corner point B to be corrected).

In the step S520, a gradient of each pixel in the second local region containing the initial corner point to be corrected is calculated. The step S520 will be described respectively in two cases.

Particularly in the case that the initial corner point to be corrected is a non-right-angled corner point (e.g., B in FIG. 4), a horizontal gradient of each pixel in the second local region (e.g., $S_B2$ in FIG. 4) containing the initial corner point to be corrected can be calculated.

Furthermore in the case that the initial corner point to be corrected is a right-angled corner point (e.g., A in FIG. 4), either of a horizontal gradient and a vertical gradient of each pixel in the second local region (e.g., $S_A2$ in FIG. 4) containing the initial corner point to be corrected can be calculated.

Thus no matter whether the initial corner point to be corrected is a non-right-angled corner point or a right-angled corner point, the second local region corresponding to the corner point contains the corresponding first local region in which all the first candidate corner points of the initial corner point to be corrected are contained, so a horizontal gradient or a vertical gradient of each first candidate corner point of the initial corner point to be corrected can be obtained in the step S520.

Then in the step S530, the horizontal gradient or vertical gradient calculated in the step S520 is binarized. Here the binarization can be performed in any existing binarization method. Thus a grayscale value of each pixel in the second local region is set to 0 or 255. That is, each binarized pixel is either a black pixel or a white pixel. Then the flow proceeds to the step S540.

In the step S540, an amount of black pixels in a vertical region or a horizontal region related to each first candidate corner point is calculated. The step S540 will be described below respectively in two cases with respect to FIG. 6A and FIG. 6B.

Figure 6A:
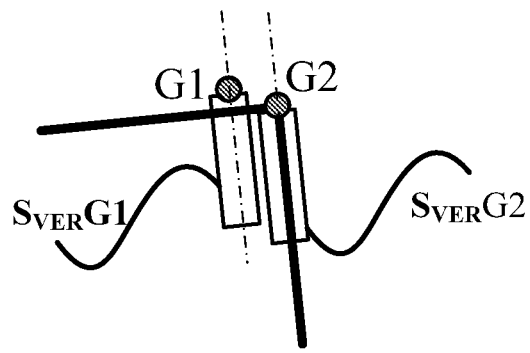
FIG. 6A is a schematic diagram illustrating a vertical region.

As illustrated in FIG. 6A, in a first case where the gradient calculated in the step S520 is the horizontal gradient, a vertical region related to each first candidate corner point is determined respectively based on the horizontal gradient, where each vertical region has a third predetermined size and is contained in the second local region (not illustrated in FIG. 6A). Then an amount of black pixels in each vertical region is obtained based on a result of binarizing the horizontal gradients of the pixels in the second local region.

Particularly the vertical region related to each first candidate corner point can be determined as follows.

Firstly a vertical direction corresponding to the first candidate corner point is obtained based on the horizontal gradient of the first candidate corner point, that is, the vertical direction is made consistent with the horizontal gradient. As illustrated in FIG. 6A, for first candidate corner points G1 and G2, vertical directions corresponding to the corner points are as illustrated respectively by dash-dotted lines respectively corresponding to G1 and G2 in the figure. Then in the case that the first candidate corner point is located in the upper half of the image (e.g., G1 and G2), a first rectangular below the first candidate corner point with a third predetermined size (e.g., $S_{VER}G1$ and $S_{VER}G2$) is determined as a veridical region related to the first candidate corner point. As illustrated in FIG. 6A, when the first candidate corner point is located at G1, the vertical region corresponding to the corner point may be $S_{VER}G1$, and when the first candidate corner point is located at G2, the vertical region corresponding to the corner point may be $S_{VER}G2$. Furthermore in the case that the first candidate corner point is located in the lower half of the image, those skilled in the art can appreciate from the description above with reference to FIG. 6A that a vertical region related to the first candidate corner point may be a second rectangular (not illustrated) located above the first candidate corner point with a third predetermined size. Particularly the longer sides of the first rectangular and the second rectangular are arranged in the vertical direction corresponding to the candidate corner point.

Figure 6B:
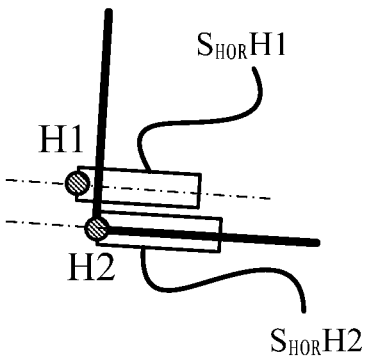
FIG. 6B is a schematic diagram illustrating a horizontal region.

As illustrated in FIG. 6B, in a second case where the gradient calculated in the step S520 is vertical gradient, a horizontal region related to each first candidate corner point is determined respectively based on the vertical gradient, where each horizontal region has a fourth predetermined size and is contained in the second local region (not illustrated in FIG. 6B). Then an amount of black pixels in each horizontal region is obtained based on a result of binarizing the vertical gradients of the pixels in the second local region.

Particularly the horizontal region related to each first candidate corner point can be determined as follows.

Firstly a horizontal direction corresponding to the first candidate corner point is obtained based on the vertical gradient of the first candidate corner point, that is, the horizontal direction is made consistent with the vertical gradient. As illustrated in FIG. 6B, for first candidate corner points H1 and H2, horizontal directions corresponding to the corner points are as illustrated respectively by dash-dotted lines respectively corresponding to H1 and H2 in the figure. Then in the case that the first candidate corner point is located in the left half of the image (e.g., H1 and H2), a third rectangular to the right of the first candidate corner point with a four predetermined size (e.g., $S_{HOR}H1$ and $S_{HOR}H2$) is determined as a horizontal region related to the first candidate corner point. As illustrated in FIG. 6B, when the first candidate corner point is located at H1, the horizontal region corresponding to the corner point may be $S_{HOR}H1$, and when the first candidate corner point is located at H2, the horizontal region corresponding to the corner point may be $S_{HOR}H2$. Furthermore in the case that the first candidate corner point is located in the right half of the image, those skilled in the art can appreciate from the description above with reference to FIG. 6B that a horizontal region related to the first candidate corner point may be a fourth rectangular (not illustrated) to the left of the first candidate corner point with a fourth predetermined size. Particularly the longer sides of the third rectangular and the fourth rectangular are arranged in the horizontal direction corresponding to the candidate corner point.

Thus after the steps S510 to S540 as illustrated in FIG. 5 are performed, the flow proceeds to the step S240. At this time, in the step S240, first candidate corner points which meet a predetermined condition are selected among the first candidate corner points of the initial corner point to be corrected as second candidate corner points of the initial corner point to be corrected. For the sake of convenience, the second candidate corner points currently obtained (that is, obtained by performing the processes of the steps S510 to S540 and the step S240 for the first candidate corner points) will be referred below to as firstly-filtered candidate corner points. Particularly in the case that the gradient calculated in the step S520 is the horizontal gradient, the first candidate corner points which meet the predetermined condition may be those first candidate corner points, each of which has a corresponding vertical region with an amount of black pixels above a second predetermined threshold or those first N2 first candidate corner points, each of which has a corresponding vertical region with the largest amount of black pixels, where N2 is a predetermined natural number; and similarly in the case that the gradient calculated in the step S520 is the vertical gradient, the first candidate corner points which meet the predetermined condition may be those first candidate corner points, each of which has a corresponding horizontal region with an amount of black pixels above a second predetermined threshold or those first N2 first candidate corner points, each of which has a corresponding horizontal region with the largest amount of black pixels, where N2 is a predetermined natural number.

Thus vertical filtering (corresponding to the case that the horizontal gradient is calculated) or horizontal filtering (corresponding to the case that the vertical gradient is calculated) of the first candidate corner points has been performed in the steps S510 to S540 and the step S240. Then the flow proceeds to the step S250.

In the step S250, if the gradient calculated in the step S520 is the horizontal gradient, then that second candidate corner point having a corresponding vertical region with the largest amount of black pixels is selected among the current firstly-filtered candidate corner points and substituted for the initial corner point to be corrected to thereby correct the initial corner point to be corrected. Furthermore if the gradient calculated in the step S520 is the vertical gradient, then that second candidate corner point having a corresponding horizontal region with the largest amount of black pixels is selected among the current firstly-filtered candidate corner points and substituted for the initial corner point to be corrected to thereby correct the initial corner point to be corrected.

Figure 7:
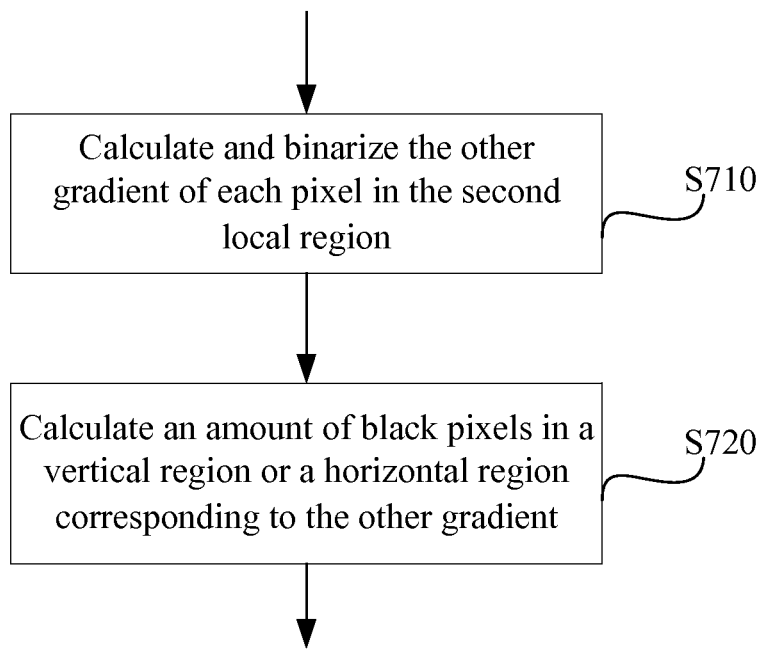
FIG. 7 is a flow chart illustrating schematically a part of another possible exemplary process of the step S230 in the process flow 200 as illustrated in FIG. 2.

Furthermore in another specific implementation of the method for correcting a corner point of an image according to the embodiment of the invention, for the initial corner point to be corrected which is a right-angled corner point, the process of the step S230 can also be performed in the steps S510 to S540 as illustrated in FIG. 5 and the steps S710 to S720 as illustrated in FIG. 7.

In this specific implementation, firstly the steps S510 to S540 are performed for the initial corner point to be corrected which is a right-angled corner point. Then the steps S710 to S720 and next the step S240 and the step S250 can be performed. Here the steps S510 to S540 are similar to the process described above, and therefore a repeated description thereof will be omitted here.

In the step S710, for the initial corner point to be corrected which is a right-angled corner point, the other gradient of the horizontal gradient and the vertical gradient of each pixel in the second local region containing the initial corner point to be corrected is calculated, and the other gradient is binarized. That is, when the gradient calculated in the step S520 is the vertical gradient, the horizontal gradient is calculated in the step S710; and when the gradient calculated in the step S520 is the horizontal gradient, the vertical gradient is calculated in the step S710. Then the flow proceeds to the step S720.

In the step S720, an amount of black pixels in a vertical region or a horizontal region corresponding to the other gradient is calculated. The step S720 will be described below respectively in two cases.

In a first case where the other gradient calculated in the step S710 is the vertical gradient, a horizontal region related to each first candidate corner point is determined respectively based on the vertical gradient, where each horizontal region has a fourth predetermined size and is contained in the second local region. Then an amount of black pixels in each horizontal region is obtained based on a result of binarizing the vertical gradients of the pixels in the second local region.

In a second case where the other gradient calculated in the step S710 is the horizontal gradient, a vertical region related to each first candidate corner point is determined respectively based on the horizontal gradient, where each vertical region has a third predetermined size and is contained in the second local region. Then an amount of black pixels in each vertical region is obtained based on a result of binarizing the horizontal gradients of the pixels in the second local region.

Particularly, for example, all of processes of calculating the horizontal gradient and the vertical gradient and of processes of determining the horizontal region and the vertical region involved in the steps S710 and S720 are similar to the corresponding processes described above, and a repeated description thereof will be omitted here.

Then in this implementation, after the steps S710 and S720 are performed, the flow proceeds to the steps S240 and S250. Particularly in the step S240, the operation as described above can firstly be performed to obtain the firstly-filtered candidate corner points of the initial corner point to be corrected; and then a part of the firstly-filtered candidate corner points of the initial corner point to be corrected can be selected as secondly-filtered candidate corner points. For example, the selected part of the firstly-filtered candidate corner points can be those firstly-filtered candidate corner points, each of which has a corresponding vertical region (corresponding to the case that the other gradient is the horizontal gradient) or horizontal region (corresponding to the case that the other gradient is the vertical gradient) with an amount of black pixels being above a third predetermined threshold or first N3 second candidate corner points, each of which has a corresponding vertical region or horizontal region with the largest amount of black pixels, where N3 is a predetermined natural number. Thus vertical or horizontal filtering of the firstly-filtered candidate corner points is performed in the steps S710 to S720 and the step S240. At this time equivalently two rounds of filtering (i.e., vertical filtering and horizontal filtering or horizontal filtering and vertical filtering) are performed on the first candidate corner points so that the secondly-filtered candidate corner points are obtained after these two rounds of filtering. Then the flow proceeds to the step S250.

Then in the step S250, if the other gradient calculated in the step S710 is the vertical gradient, then that secondly-filtered candidate corner point having a corresponding horizontal region with the largest amount of black pixels is selected among the secondly-filtered candidate corner points and substituted for the initial corner point to be corrected, to thereby correct the initial corner point to be corrected. Furthermore if the other gradient calculated in the step S710 is the horizontal gradient, then that secondly-filtered candidate corner point having a corresponding vertical region with the largest amount of black pixels is selected among the current secondly-filtered candidate corner points and substituted for the initial corner point to be corrected, to thereby correct the initial corner point to be corrected.

Figure 8:
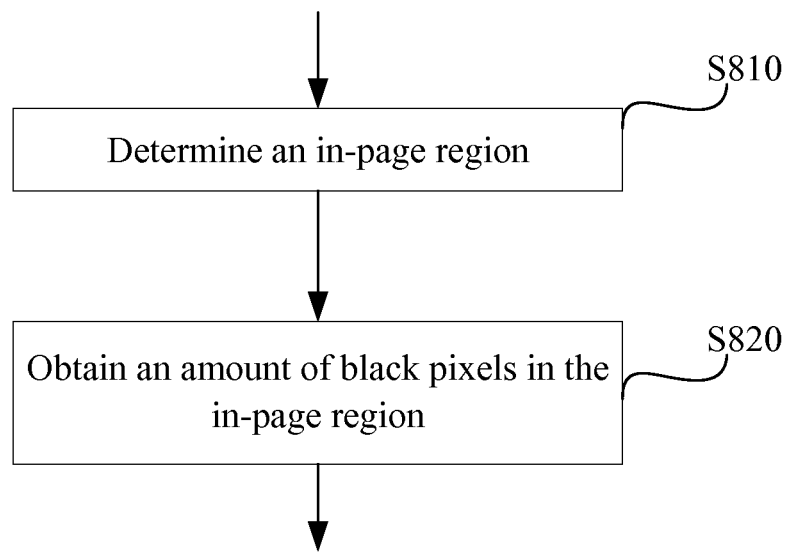
FIG. 8 is a flow chart illustrating schematically a part of a further possible exemplary process of the step S230 in the process flow 200 as illustrated in FIG. 2.

Furthermore in a further specific implementation of the method for correcting a corner point of an image according to the embodiment of the invention, the step S230 can further include the steps S810 to S820 as illustrated in FIG. 8 in addition to the steps S510 to S540 (and preferably also the steps S710 to S720). Specifically in this implementation, in the case that the initial corner point to be corrected is a right-angled corner point, the steps S810 to S820 as illustrated in FIG. 8 can be further performed before or after the steps S510 to S540 (and preferably also the steps S710 to S720); and in the case that the initial corner point to be corrected is a non-right-angled corner point, the steps S810 to S820 as illustrated in FIG. 8 can be further performed before or after the steps S510 to S540. Particularly processes of the S510 to S540 and the steps S710 to S720 are similar to those described above, and a repeated description thereof will be omitted here.

For example, exemplary processes of the steps S810 to S820 will be described taking processes of the steps S810 to S820 performed for the firstly-filtered candidate corner points obtained in the steps S510 to S540 as an example. In this example, firstly-filtered candidate corner points are firstly obtained in the steps S510 to S540 (in a specific process as described above). Then in the step S810, an in-page region related to each second candidate corner point among the firstly-filtered candidate corner points is determined respectively, where each in-page region has a fifth predetermined size and is contained in the second local region. Then the flow proceeds to the step S820.

Figure 9:
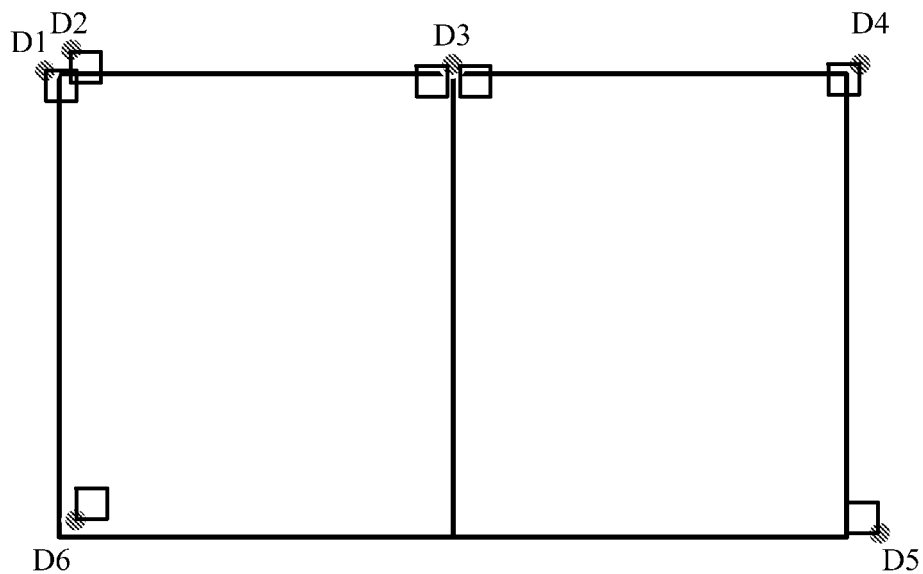
FIG. 9 is a schematic diagram illustrating an in-page region of a second candidate corner port of an image.

Furthermore the in-page region may be a square region, a rectangular region, or a round region, etc. As illustrated in FIG. 9, for example, the in-page region of each second candidate corner point among the firstly-filtered candidate corner points is a square region with the second candidate corner point being a vertex respectively. In the case that the second candidate corner point is at the top-left (e.g., D1 and D2), the bottom-left (e.g., D6), the top-right (e.g., D4) and the bottom-right (e.g., D5) respectively of the image (that is, the second candidate corner point is a right-angled corner point), the in-page region of the second candidate corner point is at the bottom-right, the top-right, the bottom-left and the top-left respectively of the second candidate corner point. As illustrated in FIG. 9, when the second candidate corner point is at the middle-top of the image (e.g., D3) (where the second candidate corner point is a non-right-angled corner point), the in-page region of the second candidate corner point includes two in-pages regions which are at the bottom-left and the bottom-right respectively of the second candidate corner point; and furthermore when the second candidate corner point is at the middle-bottom of the image (not illustrated) (where the second candidate corner point is a non-right-angled corner point), the in-page region of the second candidate corner point includes two in-pages regions (not illustrated) which are at the top-left and the top-right respectively of the second candidate corner point.

Then in the step S820, an amount of black pixels in the in-page region is obtained based on the result of binarizing the vertical gradients and/or the horizontal gradients of the pixels in the second local region. It shall be noted that the process flow of the steps S810 to S820 is additional in this implementation to the previous two implementations, so it is necessary to make the in-page region determined in the steps S810 to S820 be respectively in the second local region corresponding to the in-page region so that the amount of black pixels in the in-page region can be calculated using the gradients of the pixels in the second local region.

Then after the steps S810 to S820 are performed, the flow proceeds to the steps S240 and S250. Particularly in the step S240, the operation described above (e.g., vertical filtering or horizontal filtering) can firstly be performed to obtain the firstly-filtered candidate corner points of the initial corner point to be corrected; and then a part of the current firstly-filtered candidate corner points can be selected and retained as in-page-filtered candidate corner points. For example, the selected part of the firstly-filtered candidate corner points can be those second candidate corner points, each of which has a corresponding in-page region with an amount of black pixels being below a fourth predetermined threshold or first N4 second candidate corner points, each of which has a corresponding in-page region with the smallest amount of black pixels, where N4 is a predetermined natural number. Thus in-page filtering of the firstly-filtered candidate corner points is performed in the steps S810 to S820 and the step S240.

Then in the step S250, that second candidate corner point having a corresponding in-page region with the smallest amount of black pixels is selected among the current in-page-filtered candidate corner points and substituted for the initial corner point to be corrected, to thereby correct the initial corner point to be corrected.

Those skilled in the art shall appreciate that the steps S810 to S820 can alternatively be performed after the steps S710 to S720 or before the steps S510 to S540, and correspondingly "the secondly-filtered candidate corner points" or "the first candidate corner points" can simply be substituted for the processed object, "the firstly-filtered candidate corner points" in the steps S810 to S820, so a repeated description thereof will be omitted here.

Furthermore in a further specific implementation of the method for correcting a corner point of an image according to the embodiment of the invention, the step S230 can alternatively include only the steps S810 to S820 as illustrated in FIG. 7. In this specific implementation, the steps S810 to S820 are similar to the processes of the steps S810 to S820 described above, and a repeated description thereof will be omitted here.

With the method for correcting a corner point of an image according to the embodiment of the invention, one or more rounds of filtering and selection can be performed on an initial corner point using local information and relatively global document information to thereby correct the initial corner point; and a roughly detected corner point obtained in an existing method for detecting a corner point can be corrected in the method for correcting a corner point of an image according to the embodiment of the invention to thereby improve the precision detecting the corner point. The method for correcting a corner point of an image according to the embodiment of the invention can be applicable to document correction or scan processing to thereby improve the precision of document correction or scan processing.

An embodiment of the invention further provides an apparatus for correcting a corner point of an image, and the apparatus for correcting a corner point of an image according to the embodiment of the invention will be described below with reference to FIG. 10 to FIG. 12.

Figure 10:
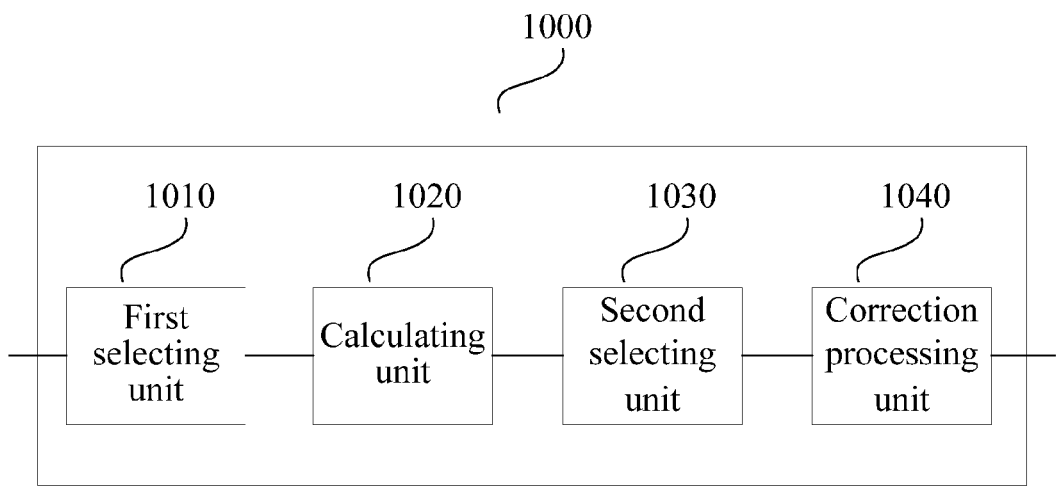
FIG. 10 is a block diagram illustrating schematically an exemplary structure of an apparatus for correcting a corner point of an image according to an embodiment of the invention.

FIG. 10 is a block diagram illustrating schematically an exemplary structure of an apparatus for correcting a corner point of an image according to an embodiment of the invention;

As illustrated in FIG. 10, the apparatus 1000 for correcting a corner point of an image according to the embodiment of the invention includes: a first selecting unit 1010 configured to determine, with regard to each initial corner point of the image, first candidate corner points of the initial corner point in a first local region that contains the initial corner point, where the first local region has a first predetermined size; a calculating unit 1020 configured to obtain, with regard to each initial corner point of the image, information related to the image in a second local region that contains the initial corner point, where the second local region has a second predetermined size and contains the first local region; a second selecting unit 1030 configured to select, among the first candidate corner points of each initial corner point, first candidate corner points which meet a predetermined condition as second candidate corner points of the initial corner point according to the obtained information related to the image; and a correction processing unit 1040 configured to correct each initial corner point using the second candidate corner points of the initial corner point.

Figure 11:
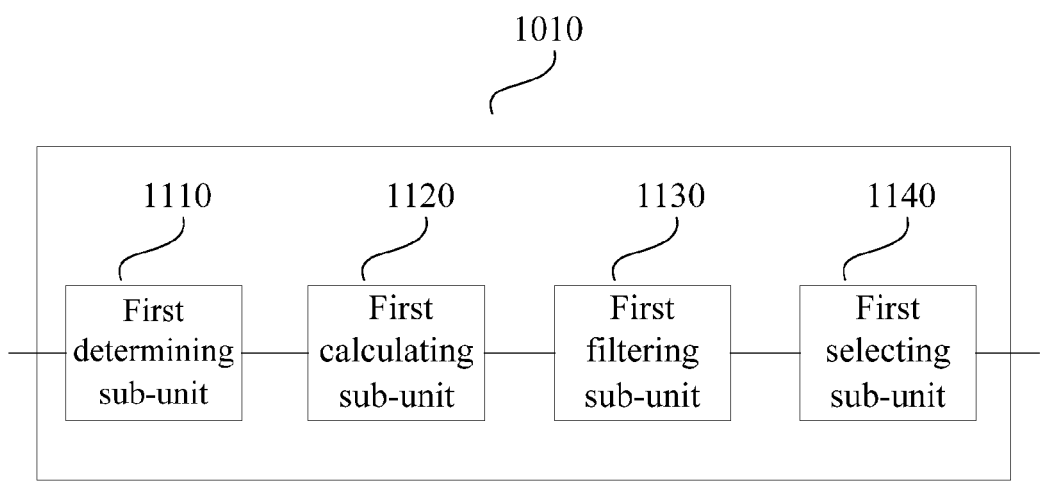
FIG. 11 is a block diagram illustrating schematically an exemplary structure of a first selecting unit 1010 as illustrated in FIG. 10.

FIG. 11 is a block diagram illustrating schematically an exemplary structure of the first selecting unit 1010 as illustrated in FIG. 10. As illustrated in FIG. 11, the first selecting unit 1010 can include a first determining sub-unit 1110, a first calculating sub-unit 1120, a first filtering sub-unit 1130 and a first selecting sub-unit 1140, where the first determining sub-unit 1110, the first calculating sub-unit 1120, the first filtering sub-unit 1130 and the first selecting sub-unit 1140 can be configured respectively to perform the process in the step S310, the step S320, the step S330 and the step S340 described above, and therefore a detailed description of these sub-units will be omitted here for the sake of conciseness.

Figure 12:
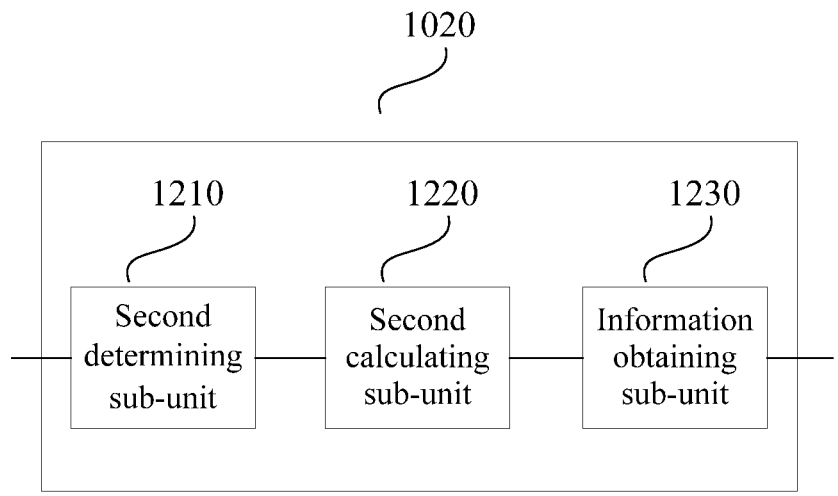
FIG. 12 is a block diagram illustrating schematically an exemplary structure of a calculating unit 1020 as illustrated in FIG. 10.

FIG. 12 is a block diagram illustrating schematically an exemplary structure of the calculating unit 1020 as illustrated in FIG. 10. As illustrated in FIG. 12, the calculating unit 1020 can include a second determining sub-unit 1210, a second calculating sub-unit 1220 and an information obtaining sub-unit 1230.

In an implementation of the apparatus for correcting a corner point of an image according to the embodiment of the invention, the second determining sub-unit 1210 can be configured to perform the processes of the step S510 described above, the second calculating sub-unit 1220 can be configured to perform the processes of the steps S520 and S530 described above, the information obtaining sub-unit 1230 can be configured to perform the process of the step S540 described above. Alike a detailed description of these sub-units will be omitted here for the sake of conciseness.

Particularly in this implementation, the second selecting unit 1030 can be configured to select, in the plurality of first candidate corner points of the initial corner point, the following first candidate corner points as the second candidate corner points of the initial corner point: first candidate corner points, each of which has a corresponding vertical region or horizontal region with an amount of black pixels being above a second predetermined threshold; or first N2 first candidate corner points, each of which has a corresponding vertical region or horizontal region with the largest amount of black pixels, where N2 is a predetermined natural number.

Furthermore in another implementation of the apparatus for correcting a corner point of an image according to the embodiment of the invention, the second calculating sub-unit 1220 can be configured to perform the processes of the steps S710 and S720 described above after performing the processes of the steps S520 and S530 described above. Alike a detailed description of the sub-unit will be omitted here for the sake of conciseness.

Particularly in this implementation, the second selecting unit 1030 can be configured, in the case where the initial corner point is a right-angle corner point, to select and retain the following second candidate corner points among the current second candidate corner points: second candidate corner points, each of which has a corresponding vertical region or horizontal region, related to the other gradient, with an amount of black pixels being above a third predetermined threshold; or first N3 second candidate corner points, each of which has a corresponding vertical region or horizontal region, related to the other gradient, with the largest amount of black pixels, where N3 is a predetermined natural number.

Furthermore in a further implementation of the apparatus for correcting a corner point of an image according to the embodiment of the invention, the second calculating sub-unit 1220 can be configured to perform the processes of the steps S810 and S820 described above before or after performing the processes of the steps S520 and S530 described above (and preferably also of the steps S710 and S720). Alike a detailed description of the sub-unit will be omitted here for the sake of conciseness.

Particularly in this implementation, the second selecting unit 1030 can be configured to select and retain the following second candidate corner points among the current second candidate corner points: second candidate corner points, each of which has a corresponding in-page region with an amount of black pixels being below a fourth predetermined threshold; or first N4 second candidate corner points, each of which has a corresponding in-page region with the smallest amount of black pixels, where N4 is a predetermined natural number.

With the apparatus for correcting a corner point of an image according to the embodiment of the invention, one or more rounds of filtering and selection can be performed on an initial corner point using local information and relatively global document information to thereby correct the initial corner point; and a roughly detected corner point obtained in an existing detector for detecting a corner point can be corrected in the apparatus for correcting a corner point of an image according to the embodiment of the invention to thereby improve the precision detecting the corner point.

The apparatus for correcting a corner point of an image according to the embodiment of the invention can be applicable to document correction or scan processing to thereby improve the precision of document correction or scan processing.

Furthermore an embodiment of the invention further provides an image processing device including the apparatus for correcting a corner point of an image described above, where the image processing device may be a document correcting device or a scanner.

With the image processing device according to the embodiment of the invention, a precise corner point can be obtained using the apparatus for correcting a corner point of an image to thereby improve the precision of such a image process as document correction or scan.

The respective constituting units, sub-units, etc., in the apparatus for correcting a corner point of an image according to the embodiment of the invention described above can be configured in software, firmware, hardware or any combination thereof. In the case of being embodied in software or firmware, program constituting the software or firmware can be installed from a storage medium or a network to a machine with a dedicated hardware structure (e.g., a general-purpose machine 1300 illustrated in FIG. 13) which can perform the various functions of the respective constituting units, sub-units, etc., when various pieces of programs are installed thereon.

Figure 13:
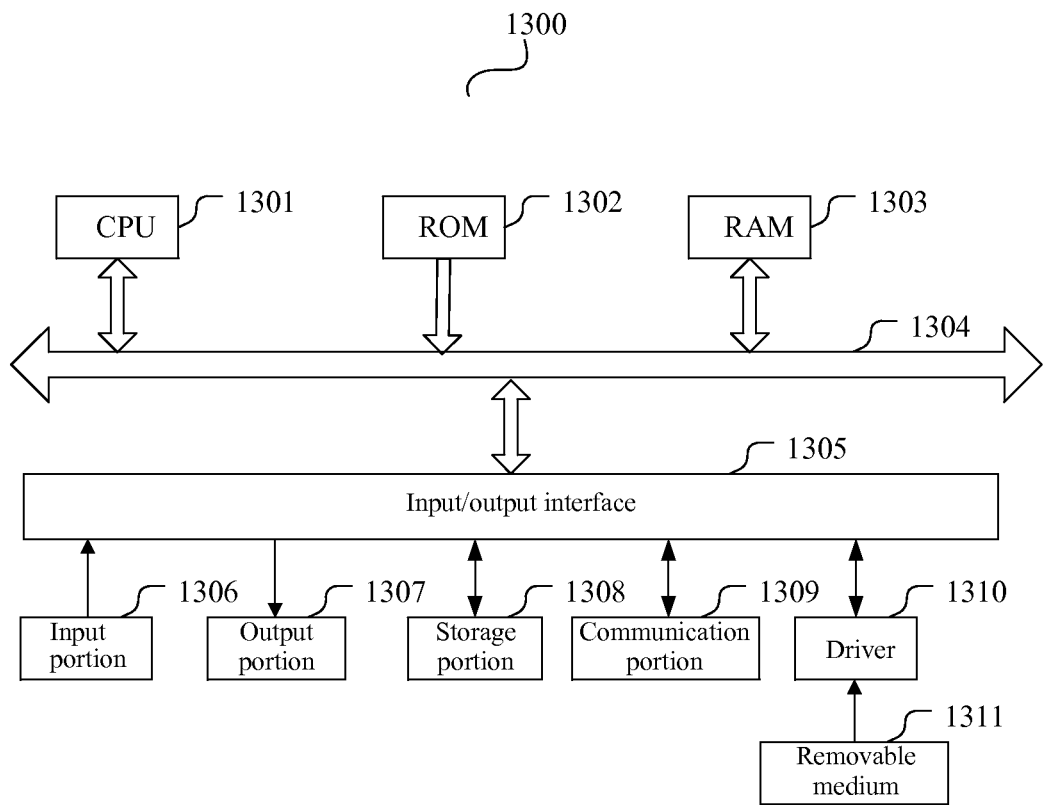
FIG. 13 is a simplified structural diagram of hardware configuration of a possible information processing device in which the method and apparatus for correcting a corner point of an image according to the embodiments of the invention can be embodied.

FIG. 13 is a simplified structural diagram of hardware configuration of a possible information processing device by which the method for correcting a corner point of an image and the apparatus for correcting a corner point of an image according to the embodiments of the invention can be embodied.

In FIG. 13, a Central Processing Unit (CPU) 1301 performs various processes according to program stored in a Read Only Memory (ROM) 1302 or loaded from a storage portion 1308 into a Random Access Memory (RAM) 1303 in which data required when the CPU 1301 performs the various processes, etc., is also stored as needed. The CPU 1301, the ROM 1302 and the RAM 1303 are connected to each other via a bus 1304 to which an input/output interface 1305 is also connected.

The following components are connected to the input/output interface 1305: an input portion 1306 (including a keyboard, a mouse, etc.); an output portion 1307 (including a display, e.g., a Cathode Ray Tube (CRT), a Liquid Crystal Display (LCD), etc., a speaker, etc.); a storage port 1308 (including a hard disk, etc.); and a communication portion 1309 (including a network interface card, e.g., an LAN card, a modem, etc). The communication portion 1309 performs a communication process over a network, e.g., the Internet. A driver 1310 is also connected to the input/output interface 1305 as needed. A removable medium 1311, e.g., a magnetic disk, an optical disk, an optic-magnetic disk, a semiconductor memory, etc., can be installed on the driver 1310 as needed so that computer program fetched therefrom can be installed into the storage portion 1308 as needed.

In the case that the foregoing series of processes are performed in software, program constituting the software can be installed from a network, e.g., the Internet, etc., or a storage medium, e.g., the removable medium 1311, etc.

Those skilled in the art shall appreciate that such a storage medium will not be limited to the removable medium 1311 illustrated in FIG. 13 in which the program is stored and which is distributed separately from the apparatus to provide a user with the program. Examples of the removable medium 1311 include a magnetic disk (including a Floppy Disk), an optical disk (including Compact Disk-Read Only memory (CD-ROM) and a Digital Versatile Disk (DVD)), an optic-magnetic disk (including a Mini Disk (MD) (a registered trademark)) and a semiconductor memory. Alternatively the storage medium can be the ROM 1302, a hard disk included in the storage port 1308, etc., in which the program is stored and which is distributed together with the apparatus including the same to the user.

Furthermore the invention further proposes a product program on which machine readable instruction codes are stored. The instruction codes upon being read and executed by a machine can perform the method for correcting a corner point of an image according to the embodiment of the invention. Correspondingly various storage mediums on which such a program product is carried, e.g., a magnetic disk, an optical disk, an optic-magnetic disk, a semiconductor memory, etc., will also be encompassed in the disclosure of the invention.

In the foregoing description of the embodiments of the invention, a feature described and/or illustrated with respect to an implementation can be used identically or similarly in one or more other implementations in combination with or in place of a feature in the other implementation(s).

It shall be emphasized that the term "including/comprising" as used in this context indicates the presence of a feature, an element, a step or a component but does not preclude the presence or addition of one or more other features, elements, steps or components. Such ordinal terms as "first", "second", etc., do not indicate an order in which features, elements, steps or components defined by these terms are implemented or their degrees of importance but are merely intended to distinguish these features, elements, steps or components from each other for the sake of clarity.

Furthermore the methods according to the respective embodiments of the invention will not necessarily be performed in a sequential order described in the specification or illustrated in the drawings but can alternatively be performed in another sequential order concurrently or separately. Therefore the technical scope of the invention will not be limited by the order in which the methods are performed as described in the specification.

Furthermore apparently the respective operation processes of the methods according to the invention described above can also be embodied in computer executable program stored in various machine readable storage mediums Moreover the object of the invention can also be attained as follows: the storage medium in which the executable program codes can be stored is provided directly or indirectly to a system or a device and a computer or a Central Processing Unit (CPU) in the system or the device can read and execute the program codes.

At this time an implementation of the invention will not be limited to the program so long as the system or the device has the function of executing the program, and the program can also be in any form, e.g., object program, program executed by an interpreter, script program provided to an operating system, etc.

These machine readable storage mediums listed above include but will not be limited to various memories and storage units, semiconductor devices, magnetic disk units, e.g., optical, magnetic and optic-magnetic disks, other mediums suitable for storing information, etc.

Furthermore the invention can also be embodied by a customer computer being connected to a corresponding website over the Internet and downloading and installing thereon the computer program codes according to the invention and then executing the program.

Finally it shall be noted that such relationship terms in this context as left and right, first and second, etc., are merely intended to distinguish one entity or operation from another entity or operation but not necessarily intended to require or suggest any such a real relationship or order between these entities or operations. Furthermore the terms "include", "comprise" and any variants thereof are intended to encompass nonexclusive inclusion so that a process, a method, an article or an apparatus including a series of elements includes both those elements and one or more other elements which are not listed explicitly or one or more elements inherent to the process, the method, the article or the apparatus. Unless stated otherwise, an element being defined in the sentence "include/ comprise a(n) . . . " will not exclude the presence of one or more additional identical element in the process, the method, the article or the apparatus including the element.

In summary the invention provides the following solutions in the embodiments of the invention:

Annex 1. A method for correcting a corner point of an image, including: with regard to each initial corner point of the image, determining first candidate corner points of the initial corner point in a first local region that contains the initial corner point, wherein the first local region has a first predetermined size; with regard to each initial corner point of the image, obtaining information related to the image in a second local region that contains the initial corner point, wherein the second local region has a second predetermined size and contains the first local region; selecting, among the first candidate corner points of each initial corner point, first candidate corner points which meet a predetermined condition, as second candidate corner points of the initial corner point according to the obtained information related to the image; and correcting each initial corner point using the second candidate corner points of the initial corner point.

Annex 2. The method for correcting a corner point of an image according to annex 1, wherein the determining first candidate corner points of the initial corner point in a first local region that contains the initial corner point comprises: determining a first local region that contains the initial corner point; calculating a response value of each pixel in the first local region; selecting pixels meeting the following condition in the first local region: pixels, each of which is a pixel with the highest response value among all of pixels in a neighborhood of the pixel with a predetermined size; and determining the following pixels among the selected pixels as the first candidate corner points of the initial corner point: pixels with response values above a first predetermined threshold; or first N1 pixels with the highest response values, wherein N1 is a predetermined natural number.

Annex 3. The method for correcting a corner point of an image according to annex 1 or 2, wherein the obtaining information related to the image in the second local region that contains the initial corner point comprises: determining the second local region that contains the initial corner point; in the case where the initial corner point is a non-right-angled corner point, calculating a horizontal gradient of each pixel in the second local region; and in the case where the initial corner point is a right-angled corner point, calculating either of a horizontal gradient and a vertical gradient of each pixel in the second local region; binarizing the calculated horizontal gradient or vertical gradient; and in the case of calculating the horizontal gradient, determining respectively a vertical region related to each first candidate corner point based on the horizontal gradient, wherein each vertical region has a third predetermined size and is contained in the second local region, and obtaining an amount of black pixels in each vertical region based on a result of binarizing the horizontal gradients of the pixels in the second local region; and in the case of calculating the vertical gradient, determining respectively a horizontal region related to each first candidate corner point based on the vertical gradient, wherein each horizontal region has a forth predetermined size and is contained in the second local region, and obtaining an amount of black pixels in each horizontal region based on a result of binarizing the vertical gradients of the pixels in the second local region.

Annex 4. The method for correcting a corner point of an image according to annex 3, wherein the selecting, among the first candidate corner points of each initial corner point, first candidate corner points which meet a predetermined condition as second candidate corner points of the initial corner point comprises: selecting, among the plurality of first candidate corner points of the initial corner point, the following first candidate corner points as the second candidate corner points of the initial corner point: first candidate corner points, each of which has a corresponding vertical region or horizontal region with an amount of black pixels being above a second predetermined threshold; or first N2 first candidate corner points, each of which has a corresponding vertical region or horizontal region with the largest amount of black pixels, wherein N2 is a predetermined natural number.

Annex 5. The method for correcting a corner point of an image according to annex 4, wherein the obtaining information related to the image in a second local region that contains the initial corner point further comprises: in the case where the initial corner point is a right-angled corner point, calculating the other gradient of the horizontal gradient and the vertical gradient of each pixel in the second local region, and binarizing the other gradient; and in the case where the other gradient is the horizontal gradient, determining respectively a vertical region related to each first candidate corner point based on the other gradient, wherein each vertical region has a third predetermined size and is contained in the second local region, and obtaining an amount of black pixels in each vertical region based on a result of binarizing the horizontal gradients of the pixels in the second local region; and in the case where the other gradient is the vertical gradient, determining respectively a horizontal region related to each first candidate corner point based on the other gradient, wherein each horizontal region has a forth predetermined size and is contained in the second local region, and obtaining an amount of black pixels in each horizontal region based on a result of binarizing the vertical gradients of the pixels in the second local region.

Annex 6. The method for correcting a corner point of an image according to annex 5, wherein the selecting, among the first candidate corner points of each initial corner point, first candidate corner points which meet a predetermined condition as second candidate corner points of the initial corner point further comprises: in the case where the initial corner point is a right-angle corner point, selecting and retaining the following second candidate corner points among the current second candidate corner points: second candidate corner points, each of which has a corresponding vertical region or horizontal region, related to the other gradient, with an amount of black pixels being above a third predetermined threshold; or first N3 second candidate corner points, each of which has a corresponding vertical region or horizontal region, related to the other gradient, with the largest amount of black pixels, wherein N3 is a predetermined natural number.

Annex 7. The method for correcting a corner point of an image according to any one of annexes 4-6, wherein the obtaining information related to the image in the second local region that contains the initial corner point further comprises: with regard to each of the current second candidate corner points, determining an in-page region related to the second candidate corner point, wherein each in-page region has a fifth predetermined size and is contained in the second local region, and obtaining an amount of black pixels in the in-page region based on the result of binarizing the vertical gradients and/or the horizontal gradients of the pixels in the second local region.

Annex 8. The method for correcting a corner point of an image according to annex 7, wherein the selecting, among the first candidate corner points of each initial corner point, first candidate corner points which meet a predetermined condition as second candidate corner points of the initial corner point further comprises: selecting and retaining the following second candidate corner points among the current second candidate corner points: second candidate corner points, each of which has a corresponding in-page region with an amount of black pixels being below a fourth predetermined threshold; or first N4 second candidate corner points, each of which has a corresponding in-page region with the smallest amount of black pixels, wherein N4 is a predetermined natural number.

Annex 9. The method for correcting a corner point of an image according to annex 7 or 8, wherein the in-page region related to the second candidate corner point is a square region with a vertex of the square region being the second candidate corner point, and in the case that the second candidate corner point is at the top-left, the bottom-left, the top-right and the bottom-right respectively of the image, the in-page region related to the second candidate corner point is at the bottom-right, the top-right, the bottom-left and the top-left respectively of the second candidate corner point; in the case that the second candidate corner point is at the middle-top of the image, the in-page region related to the second candidate corner point includes two in-pages regions which are at the bottom-left and the bottom-right respectively of the second candidate corner point; and in the case that the second candidate corner point is at the middle-bottom of the image, the in-page region related to the second candidate corner point includes two in-pages regions which are at the top-left and the top-right respectively of the second candidate corner point.

Annex 10. A apparatus for correcting a corner point of an image, including: a first selecting unit, configured to determine, with regard to each initial corner point of the image, first candidate corner points of the initial corner point in a first local region that contains the initial corner point, wherein the first local region has a first predetermined size; a calculating unit, configured to obtain, with regard to each initial corner point of the image, information related to the image in a second local region that contains the initial corner point, wherein the second local region has a second predetermined size and contains the first local region; a second selecting unit, configured to select, among the first candidate corner points of each initial corner point, first candidate corner points which meet a predetermined condition as second candidate corner points of the initial corner point according to the obtained information related to the image; and a correction processing unit, configured to correct each initial corner point using the second candidate corner points of the initial corner point.

Annex 11. The apparatus for correcting a corner point of an image according to annex 10, wherein the first selecting unit includes: a first determining sub-unit configured to determine a first local region that contains the initial corner point, wherein the first local region has the first predetermined size; a first calculating sub-unit configured to calculate a response value of each pixel in the first local region; a first filtering sub-unit configured to select pixels meeting the following condition in the first local region: pixels, each of which is a pixel with the highest response value among all of pixels in a neighborhood of the pixel with a predetermined size; and a first selecting sub-unit configured to determine the following pixels among the selected pixels as the first candidate corner points of the initial corner point: pixels with response values above a first predetermined threshold; or first N1 pixels with the highest response values, wherein N1 is a predetermined natural number.

Annex 12. The apparatus for correcting a corner point of an image according to annex 10 or 11, wherein the calculating unit includes: a second determining sub-unit configured to determine the second local region that contains the initial corner point, wherein the second local region has the second predetermined size and contains the first local region; a second calculating sub-unit configured to calculate a horizontal gradient of each pixel in the second local region in the case where the initial corner point is a non-right-angled corner point and calculate either of a horizontal gradient and a vertical gradient of each pixel in the second local region in the case where the initial corner point is a right-angled corner point and to binarize the calculated horizontal gradient or vertical gradient; and an information obtaining sub-unit configured, in the case of calculating the horizontal gradient, to determine respectively a vertical region related to each first candidate corner point based on the horizontal gradient, wherein each vertical region has a third predetermined size and is contained in the second local region, and to obtain an amount of black pixels in each vertical region based on a result of binarizing the horizontal gradients of the pixels in the second local region, and in the case of calculating the vertical gradient, to determine respectively a horizontal region related to each first candidate corner point based on the vertical gradient, wherein each horizontal region has a forth predetermined size and is contained in the second local region, and to obtain an amount of black pixels in each horizontal region based on a result of binarizing the vertical gradients of the pixels in the second local region.

Annex 13. The apparatus for correcting a corner point of an image according to annex 12, wherein the second selecting unit is configured to select, among the plurality of first candidate corner points of the initial corner point, the following first candidate corner points as the second candidate corner points of the initial corner point: first candidate corner points, each of which has a corresponding vertical region or horizontal region with an amount of black pixels being above a second predetermined threshold; or first N2 first candidate corner points, each of which has a corresponding vertical region or horizontal region with the largest amount of black pixels, wherein N2 is a predetermined natural number.

Annex 14. The apparatus for correcting a corner point of an image according to annex 13, wherein the second calculating sub-unit is further configured, in the case where the initial corner point is a right-angled corner point, to calculate the other gradient of the horizontal gradient and the vertical gradient of each pixel in the second local region and to binarize the other gradient; and the information obtaining sub-unit is further configured, in the case where the other gradient is the horizontal gradient, to determine respectively a vertical region related to each first candidate corner point based on the other gradient, wherein each vertical region has a third predetermined size and is contained in the second local region, and to obtain an amount of black pixels in each vertical region based on a result of binarizing the horizontal gradients of the pixels in the second local region; and in the case where the other gradient is the vertical gradient, to determine respectively a horizontal region related to each first candidate corner point based on the other gradient, wherein each horizontal region has a forth predetermined size and is contained in the second local region, and to obtain an amount of black pixels in each horizontal region based on a result of binarizing the vertical gradients of the pixels in the second local region.

Annex 15. The apparatus for correcting a corner point of an image according to annex 14, wherein the second selecting unit is further configured, in the case where the initial corner point is a right-angle corner point, to select and retain the following second candidate corner points among the current second candidate corner points: second candidate corner points, each of which has a corresponding vertical region or horizontal region, related to the other gradient, with an amount of black pixels being above a third predetermined threshold; or first N3 second candidate corner points, each of which has a corresponding vertical region or horizontal region, related to the other gradient, with the largest amount of black pixels, wherein N3 is a predetermined natural number.

Annex 16. The apparatus for correcting a corner point of an image according to any one of annexes 13-15, wherein the second determining sub-unit is further configured, with regard to each of the current second candidate corner points, to determine an in-page region related to the second candidate corner point, wherein each in-page region has a fifth predetermined size and is contained in the second local region; and the information obtaining sub-unit is further configured, with regard to each of the current second candidate corner points, to obtain an amount of black pixels in the in-page region based on the result of binarizing the vertical gradients and/or the horizontal gradients of the pixels in the second local region.

Annex 17. The apparatus for correcting a corner point of an image according to annex 16, wherein the second selecting unit is further configured to select and retain the following second candidate corner points among the current second candidate corner points: second candidate corner points, each of which has a corresponding in-page region with an amount of black pixels being below a fourth predetermined threshold; or first N4 second candidate corner points, each of which has a corresponding in-page region with the smallest amount of black pixels, wherein N4 is a predetermined natural number.

Annex 18. An image processing device, comprising the apparatus for correcting a corner point of an image according to any one of annexes 10 to 17.

Annex 19. The image processing device according to annex 18, wherein the image processing device is a document correcting device or a scanner.

Annex 20. A computer readable storage medium on which computer program executable by a computing device is stored, wherein the program upon being executed can cause the computing device to perform the method for correcting a corner point of an image according to any one of annexes 1 to 9.

The invention claimed is:

1. A method for correcting a corner point of an image, comprising:
   with regard to each initial corner point of the image, determining first candidate corner points of the initial corner point in a first local region that contains the initial corner point, wherein the first local region has a first predetermined size;
   with regard to each initial corner point of the image, obtaining information related to the image in a second local region that contains the initial corner point, wherein the second local region has a second predetermined size and contains the first local region;
   selecting, among the first candidate corner points of each initial corner point, first candidate corner points which meet a predetermined condition, as second candidate corner points of the initial corner point according to the obtained information related to the image; and
   correcting each initial corner point using the second candidate corner points of the initial corner point,
   wherein the obtaining information related to the image in the second local region that contains the initial corner point comprises: determining the second local region that contains the initial corner point; in the case where the initial corner point is a non-right-angled corner point, calculating a horizontal gradient of each pixel in the second local region; and in the case where the initial corner point is a right-angled corner point, calculating either of a horizontal gradient and a vertical gradient of each pixel in the second local region; binarizing the calculated horizontal gradient or vertical gradient; and in the case of calculating the horizontal gradient, determining respectively a vertical region related to each first candidate corner point based on the horizontal gradient, wherein each vertical region has a third predetermined size and is contained in the second local region, and obtaining an amount of black pixels in each vertical region based on a result of binarizinq the horizontal gradients of the pixels in the second local region; and in the case of calculating the vertical gradient, determining respectively a horizontal region related to each first candidate corner point based on the vertical gradient, wherein each horizontal region has a forth predetermined size and is contained in the second local region, and obtaining an amount of black pixels in each horizontal region based on a result of binarizinq the vertical gradient of the pixels in the second local region,
   wherein the selecting, among the first candidate corner points of each initial corner point, first candidate corner points which meet a predetermined condition as second candidate corner points of the initial corner point comprises: selecting, among the plurality of first candidate corner points of the initial corner point, the following first candidate corner points as the second candidate corner points of the initial corner point: first candidate corner points, each of which has a corresponding vertical region or horizontal region with an amount of black pixels being above a second predetermined threshold; or first N2 first candidate corner points, each of which has a corresponding vertical region or horizontal region with the largest amount of black pixels, wherein N2 is a predetermined natural number,
   wherein the obtaining information related to the image in the second local region that contains the initial corner point further comprises: with regard to each of the current second candidate corner points, determining an in-page region related to the second candidate corner point, wherein each in-page region has a fifth predetermined size and is contained in the second local region, and obtaining an amount of black pixels in the in-page region based on the result of binarizing the vertical gradients and/or the horizontal gradients of the pixels in the second local region, for further selection of the second candidate corner point.

2. The method for correcting a corner point of an image according to claim 1, wherein the determining first candidate corner points of the initial corner point in a first local region that contains the initial corner point comprises:
   determining a first local region that contains the initial corner point;
   calculating a response value of each pixel in the first local region;
   selecting pixels meeting the following condition in the first local region:
   pixels, each of which is a pixel with the highest response value among all of pixels in a neighborhood of the pixel with a predetermined size;
   and
   determining the following pixels among the selected pixels as the first candidate corner points of the initial corner point:
   pixels with response values above a first predetermined threshold; or first N1 pixels with the highest response values, wherein N1 is a predetermined natural number.

3. The method for correcting a corner point of an image according to claim 1, wherein the obtaining information related to the image in a second local region that contains the initial corner point further comprises:

in the case where the initial corner point is a right-angled corner point, calculating the other gradient of the horizontal gradient and the vertical gradient of each pixel in the second local region, and binarizing the other gradient; and in the case where the other gradient is the horizontal gradient, determining respectively a vertical region related to each first candidate corner point based on the other gradient, wherein each vertical region has a third predetermined size and is contained in the second local region, and obtaining an amount of black pixels in each vertical region based on a result of binarizing the horizontal gradients of the pixels in the second local region; and in the case where the other gradient is the vertical gradient, determining respectively a horizontal region related to each first candidate corner point based on the other gradient, wherein each horizontal region has a forth predetermined size and is contained in the second local region, and obtaining an amount of black pixels in each horizontal region based on a result of binarizing the vertical gradients of the pixels in the second local region.

4. The method for correcting a corner point of an image according to claim 3, wherein the selecting, among the first candidate corner points of each initial corner point, first candidate corner points which meet a predetermined condition as second candidate corner points of the initial corner point further comprises:

in the case where the initial corner point is a right-angle corner point, selecting and retaining the following second candidate corner points among the current second candidate corner points:

second candidate corner points, each of which has a corresponding vertical region or horizontal region, related to the other gradient, with an amount of black pixels being above a third predetermined threshold; or first N3 second candidate corner points, each of which has a corresponding vertical region or horizontal region, related to the other gradient, with the largest amount of black pixels, wherein N3 is a predetermined natural number.

5. The method for correcting a corner point of an image according to claim 1, wherein the selecting, among the first candidate corner points of each initial corner point, first candidate corner points which meet a predetermined condition as second candidate corner points of the initial corner point further comprises:

selecting and retaining the following second candidate corner points among the current second candidate corner points:

second candidate corner points, each of which has a corresponding in-page region with an amount of black pixels being below a fourth predetermined threshold; or first N4 second candidate corner points, each of which has a corresponding in-page region with the smallest amount of black pixels, wherein N4 is a predetermined natural number.

6. The method for correcting a corner point of an image according to claim 1, wherein the in-page region related to the second candidate corner point is a square region with a vertex of the square region being the second candidate corner point, and in the case that the second candidate corner point is at the top-left, the bottom-left, the top-right and the bottom-right respectively of the image, the in-page region related to the second candidate corner point is at the bottom-right, the top-right, the bottom-left and the top-left respectively of the second candidate corner point; in the case that the second candidate corner point is at the middle-top of the image, the in-page region related to the second candidate corner point includes two in-pages regions which are at the bottom-left and the bottom-right respectively of the second candidate corner point; and in the case that the second candidate corner point is at the middle-bottom of the image, the in-page region related to the second candidate corner point includes two in-pages regions which are at the top-left and the top-right respectively of the second candidate corner point.

7. An apparatus for correcting a corner point of an image, comprising:

a first selecting unit, configured to determine, with regard to each initial corner point of the image, first candidate corner points of the initial corner point in a first local region that contains the initial corner point, wherein the first local region has a first predetermined size;

a calculating unit, configured to obtain, with regard to each initial corner point of the image, information related to the image in a second local region that contains the initial corner point, wherein the second local region has a second predetermined size and contains the first local region;

a second selecting unit, configured to select, among the first candidate corner points of each initial corner point, first candidate corner points which meet a predetermined condition as second candidate corner points of the initial corner point according to the obtained information related to the image; and a correction processing unit, configured to correct each initial corner point using the second candidate corner points of the initial corner point, wherein the calculating unit includes: a second determining sub-unit configured to determine the second local region that contains the initial corner point, wherein the second local region has the second predetermined size and contains the first local region; a second calculating sub-unit configured to calculate a horizontal gradient of each pixel in the second local region in the case where the initial corner point is a non-right-angled corner point and calculate either of a horizontal gradient and a vertical gradient of each pixel in the second local region in the case where the initial corner point is a right-angled corner point and to binarize the calculated horizontal gradient or vertical gradient; and an information obtaining sub-unit configured, in the case of calculating the horizontal gradient, to determine respectively a vertical region related to each first candidate corner point based on the horizontal gradient, wherein each vertical region has a third predetermined size and is contained in the second local region, and to obtain an amount of black pixels in each vertical region based on a result of binarizing the horizontal gradients of the pixels in the second local region, and in the case of calculating the vertical gradient, to determine respectively a horizontal region related to each first candidate corner point based on the vertical gradient, wherein each horizontal region has a forth predetermined size and is contained in the second local region, and to obtain an amount of black pixels in each horizontal region based on a result of binarizing the vertical gradients of the pixels in the second local region, wherein the second selecting unit is configured to select, among the plurality of first candidate corner points of the initial corner point, the following first candidate corner points as the second candidate corner points of the initial corner point: first candidate corner points, each of which has a corresponding vertical region or horizontal region with an amount of black pixels being above a second predetermined threshold; or first N2 first candidate corner points, each of which has a corresponding vertical region or horizontal region with the largest amount of black pixels, wherein N2 is a predetermined natural number, wherein the second determining sub-unit is further configured, with regard to each of the current second candidate corner points, to determine an in-page region related to the second candidate corner point, wherein each in-page region has a fifth predetermined size and is contained in the second local region; and the information obtaining sub-unit is further configured, with regard to each of the current second candidate corner points, to obtain an amount of black pixels in the in-page region based on the result of binarizing the vertical gradients and/or the horizontal gradients of the pixels in the second local region, for further selection of the second candidate corner point.

8. The apparatus for correcting a corner point of an image according to claim 7, wherein the first selecting unit includes: a first determining sub-unit configured to determine a first local region that contains the initial corner point, wherein the first local region has the first predetermined size; a first calculating sub-unit configured to calculate a response value of each pixel in the first local region; a first filtering sub-unit configured to select pixels meeting the following condition in the first local region: pixels, each of which is a pixel with the highest response value among all of pixels in a neighborhood of the pixel with a predetermined size; and a first selecting sub-unit configured to determine the following pixels among the selected pixels as the first candidate corner points of the initial corner point: pixels with response values above a first predetermined threshold; or first N1 pixels with the highest response values, wherein N1 is a predetermined natural number.

9. The apparatus for correcting a corner point of an image according to claim 7, wherein the second calculating sub-unit is further configured, in the case where the initial corner point is a right-angled corner point, to calculate the other gradient of the horizontal gradient and the vertical gradient of each pixel in the second local region and to binarize the other gradient; and the information obtaining sub-unit is further configured, in the case where the other gradient is the horizontal gradient, to determine respectively a vertical region related to each first candidate corner point based on the other gradient, wherein each vertical region has a third predetermined size and is contained in the second local region, and to obtain an amount of black pixels in each vertical region based on a result of binarizing the horizontal gradients of the pixels in the second local region; and in the case where the other gradient is the vertical gradient, to determine respectively a horizontal region related to each first candidate corner point based on the other gradient, wherein each horizontal region has a forth predetermined size and is contained in the second local region, and to obtain an amount of black pixels in each horizontal region based on a result of binarizing the vertical gradients of the pixels in the second local region.

10. The apparatus for correcting a corner point of an image according to claim 9, wherein the second selecting unit is further configured, in the case where the initial corner point is a right-angle corner point, to select and retain the following second candidate corner points among the current second candidate corner points: second candidate corner points, each of which has a corresponding vertical region or horizontal region, related to the other gradient, with an amount of black pixels being above a third predetermined threshold; or first N3 second candidate corner points, each of which has a corresponding vertical region or horizontal region, related to the other gradient, with the largest amount of black pixels, wherein N3 is a predetermined natural number.

11. The apparatus for correcting a corner point of an image according to claim 7, wherein the second selecting unit is further configured to select and retain the following second candidate corner points among the current second candidate corner points: second candidate corner points, each of which has a corresponding in-page region with an amount of black pixels being below a fourth predetermined threshold; or first N4 second candidate corner points, each of which has a corresponding in-page region with the smallest amount of black pixels, wherein N4 is a predetermined natural number.

12. An image processing device, comprising an apparatus for correcting a corner point of an image, the apparatus for correcting a corner point of an image comprising:

a first selecting unit, configured to determine, with regard to each initial corner point of the image, first candidate corner points of the initial corner point in a first local region that contains the initial corner point, wherein the first local region has a first predetermined size;

a calculating unit, configured to obtain, with regard to each initial corner point of the image, information related to the image in a second local region that contains the initial corner point, wherein the second local region has a second predetermined size and contains the first local region;

a second selecting unit, configured to select, among the first candidate corner points of each initial corner point, first candidate corner points which meet a predetermined condition as second candidate corner points of the initial corner point according to the obtained information related to the image; and a correction processing unit, configured to correct each initial corner point using the second candidate corner points of the initial corner point, wherein the calculating unit includes: a second determining sub-unit configured to determine the second local region that contains the initial corner point, wherein the second local region has the second predetermined size and contains the first local region; a second calculating sub-unit configured to calculate a horizontal gradient of each pixel in the second local region in the case where the initial corner point is a non-right-angled corner point and calculate either of a horizontal gradient and a vertical gradient of each pixel in the second local region in the case where the initial corner point is a right-angled corner point and to binarize the calculated horizontal gradient or vertical gradient; and an information obtaining sub-unit configured, in the case of calculating the horizontal gradient, to determine respectively a vertical region related to each first candidate corner point based on the horizontal gradient, wherein each vertical region has a third predetermined size and is contained in the second local region, and to obtain an amount of black pixels in each vertical region based on a result of binarizing the horizontal gradients of the pixels in the second local region, and in the case of calculating the vertical gradient, to determine respectively a horizontal region related to each first candidate corner point based on the vertical gradient, wherein each horizontal region has a forth predetermined size and is contained in the second local region, and to obtain an amount of black pixels in each horizontal region based on a result of binarizing the vertical gradients of the pixels in the second local region, wherein the second selecting unit is configured to select, among the plurality of first candidate corner points of the initial corner point, the following first candidate corner points as the second candidate corner points of the initial corner point: first candidate corner points, each of which has a corresponding vertical region or horizontal region with an amount of black pixels being above a second predetermined threshold; or first N2 first candidate corner points, each of which has a corresponding vertical region or horizontal region with the largest amount of black pixels, wherein N2 is a predetermined natural number, wherein the second determining sub-unit is further configured, with regard to each of the current second candidate corner points, to determine an in-page region related to the second candidate corner point, wherein each in-page region has a fifth predetermined size and is contained in the second local region; and the information obtaining sub-unit is further configured, with regard to each of the current second candidate corner points, to obtain an amount of black pixels in the in-page region based on the result of binarizing the vertical gradients and/or the horizontal gradients of the pixels in the second local region, for further selection of the second candidate corner point.

13. The image processing device according to claim 12, wherein the image processing device is a document correcting device or a scanner.

14. A non-transitory computer readable storage medium on which computer program executable by a computing device is stored, wherein the program upon being executed can cause the computing device to perform a method for correcting a corner point of an image, the method comprising:

with regard to each initial corner point of the image, determining first candidate corner points of the initial corner point in a first local region that contains the initial corner point, wherein the first local region has a first predetermined size;

with regard to each initial corner point of the image, obtaining information related to the image in a second local region that contains the initial corner point, wherein the second local region has a second predetermined size and contains the first local region;

selecting, among the first candidate corner points of each initial corner point, first candidate corner points which meet a predetermined condition, as second candidate corner points of the initial corner point according to the obtained information related to the image; and correcting each initial corner point using the second candidate corner points of the initial corner point, wherein the obtaining information related to the image in the second local region that contains the initial corner point comprises: determining the second local region that contains the initial corner point; in the case where the initial corner point is a non-right-angled corner point, calculating a horizontal gradient of each pixel in the second local region; and in the case where the initial corner point is a right-angled corner point, calculating either of a horizontal gradient and a vertical gradient of each pixel in the second local region; binarizing the calculated horizontal gradient or vertical gradient; and in the case of calculating the horizontal gradient, determining respectively a vertical region related to each first candidate corner point based on the horizontal gradient, wherein each vertical region has a third predetermined size and is contained in the second local region, and obtaining an amount of black pixels in each vertical region based on a result of binarizing the horizontal gradients of the pixels in the second local region; and in the case of calculating the vertical gradient, determining respectively a horizontal region related to each first candidate corner point based on the vertical gradient, wherein each horizontal region has a forth predetermined size and is contained in the second local region, and obtaining an amount of black pixels in each horizontal region based on a result of binarizing the vertical gradient of the pixels in the second local region, wherein the selecting, among the first candidate corner points of each initial corner point, first candidate corner points which meet a predetermined condition as second candidate corner points of the initial corner point comprises: selecting, among the plurality of first candidate corner points of the initial corner point, the following first candidate corner points as the second candidate corner points of the initial corner point: first candidate corner points, each of which has a corresponding vertical region or horizontal region with an amount of black pixels being above a second predetermined threshold; or first N2 first candidate corner points, each of which has a corresponding vertical region or horizontal region with the largest amount of black pixels, wherein N2 is a predetermined natural number, wherein the obtaining information related to the image in the second local region that contains the initial corner point further comprises: with regard to each of the current second candidate corner points, determining an in-page region related to the second candidate corner point, wherein each in-page region has a fifth predetermined size and is contained in the second local region, and obtaining an amount of black pixels in the in-page region based on the result of binarizing the vertical gradients and/or the horizontal gradients of the pixels in the second local region, for further selection of the second candidate corner point.

* * * * *